United States Patent [19]
Satoh

[11] Patent Number: 6,035,130
[45] Date of Patent: Mar. 7, 2000

[54] CAMERA WITH CONDITION INDICATION FACILITY

[75] Inventor: Tatsuya Satoh, Hachioji, Japan

[73] Assignee: Olympus Optical Co., Ltd., Tokyo, Japan

[21] Appl. No.: 09/223,700

[22] Filed: Dec. 30, 1998

[30] Foreign Application Priority Data

Jan. 9, 1998 [JP] Japan .................................. 10-003356

[51] Int. Cl.⁷ .................................................. G03B 17/18
[52] U.S. Cl. ............................................. 396/52; 396/290
[58] Field of Search .............................. 396/52, 287, 290, 396/536, 537

[56] References Cited

U.S. PATENT DOCUMENTS

| | | | |
|---|---|---|---|
| 5,361,109 | 11/1994 | Kamoda et al. | 396/287 |
| 5,537,185 | 7/1996 | Ohishi et al. | 396/52 |
| 5,546,159 | 8/1996 | Imura et al. | 396/52 |
| 5,758,214 | 5/1998 | Saito et al. | 396/536 X |
| 5,923,908 | 7/1999 | Schrock et al. | 396/287 X |

FOREIGN PATENT DOCUMENTS 5-313241  11/1993  Japan .

*Primary Examiner*—W. B. Perkey
*Attorney, Agent, or Firm*—Frishauf, Holtz, Goodman, Langer & Chick, P.C.

[57] ABSTRACT

A camera with a condition indication facility allows a photographer to be informed of a camera shake condition through the use of a relatively simple construction. A plurality of shake level indicators are provided in the rear cover of the camera. The indicators are placed in the rear cover so that, when the rear cover is closed, they are positioned near the viewfinder window so as to allow the photographer to confirm the operating conditions of the camera while looking through the viewfinder window.

19 Claims, 8 Drawing Sheets

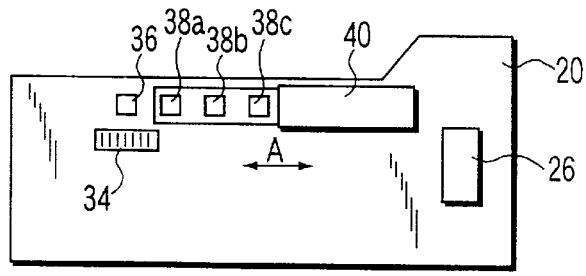
F I G. 5A
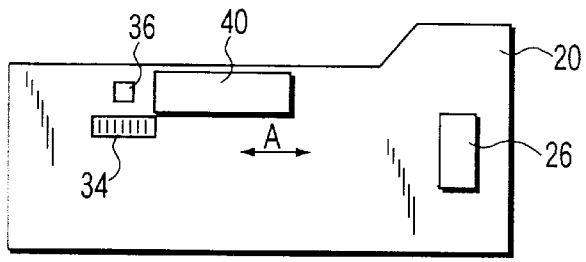
F I G. 5B
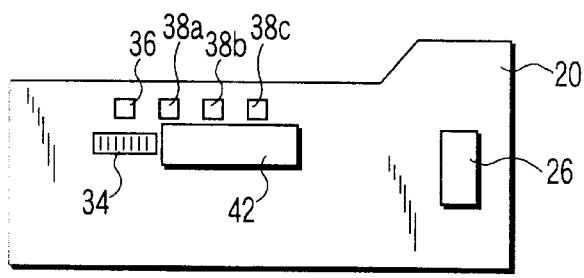
F I G. 6A
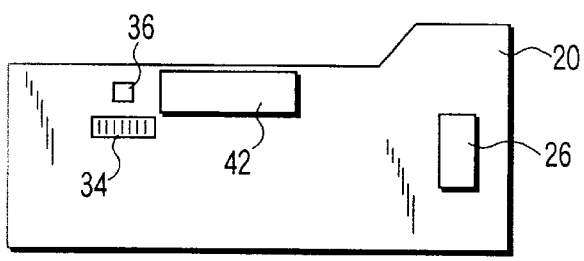
F I G. 6B

CAMERA WITH CONDITION INDICATION FACILITY

BACKGROUND OF THE INVENTION

The present invention relates to a camera with a condition indication facility and more specifically to a camera having a facility of indicating shaky conditions of a camera body.

Hitherto, various cameras are known that have a facility of indicating their current conditions. For example, Jpn. Pat. Appln. KOKAI Publication No. 5-313241 discloses a technique of detecting a shaky condition of a camera body and indicating the detected current shaky condition in the form of line segments within the viewfinder. This provides a two-dimensional indication that changes display states including the direction of a camera shake.

A general method of indicating shaky conditions of the camera body is to indicate a shaky condition within the viewfinder so as to allow the photographer to know that condition while looking through the viewfinder. In general, the shutter speed, the aperture setting, and the autofocus (AF) condition are also indicated in addition to the shaky condition.

A technique has also been known by which a shaky condition indication means is added to an existing camera body, that is, a technique to adds an indication means around the viewfinder with some means.

However, the technique disclosed in the aforementioned Patent Publication has problems that, due to the complex two-dimensional (XY) indication within the viewfinder, the viewfinder optical system becomes complex and the camera increases in size. In addition, if priority were given to the shake indication area within the viewfinder, the subject image within the viewfinder would have to be reduced in size or the shake indication area and the subject image would overlap each other, resulting in a disadvantage of the subject image becoming difficult to view.

With the aforementioned general shake indication method, to indicate a plurality of items of information within the viewfinder there are constraints in space for light emitting means, the optical system, and so on. In addition, when the information indication is concentrated in a small area, the information becomes difficult to view.

The aforementioned technique to add the shaky condition indication means to existing camera bodies, while being physical possible, requires the viewfinder optical system and the indication control system to be changed considerably in mechanism. From the point of view of size and cost, therefore, it is not a practical technique.

BRIEF SUMMARY OF THE INVENTION

It is therefore an object of the present invention to provide a camera with a condition indication facility which permits a shaky condition of the camera to be indicated to photographers with a relatively simple construction.

According to a first aspect of the present invention, there is provided a camera with a condition indication facility comprising: a camera body; a viewfinder window, provided in the camera body, through which a photographer is allowed to view a subject image; a cover of the camera that is attached to the camera body so that it can be opened and closed; and a condition indication device provided in the cover of the camera for indicating operating conditions of the camera, and wherein the condition indication device are placed so that they are positioned near the viewfinder window when the cover of the camera is closed.

According to a second aspect of the present invention, there is provided a camera with a warning facility comprising: a camera body; a viewfinder window provided in the rear of the camera body for through which a photographer is allowed to view a subject image; camera shake detecting section for detecting a camera shake condition of the camera body; shake control section responsive to the shake detecting section for calculating the amount of camera shake; warning section responsive to the shake control section for providing a warning according to the amount of camera shake calculated by the shake control section; and a camera cover member provided with the warning section, the cover member being movable between a closed position in which the warning section is placed in the proximity of the viewfinder window and an open position in which the warning member is placed separate from the viewfinder window.

According to a third aspect of the present invention, there is provided a camera with a condition indication facility comprising: a camera body; a viewfinder window, provided in the camera body, through which a photographer is allowed to view a subject image; a cover attached to the camera body, for opening and closing the body; and condition indication device provided in the cover of the camera for indicating operating conditions of the camera, and wherein the condition indication device is placed in a position that, when the cover of the camera is closed, allows a photographer to visually recognize the condition indication section while looking through the viewfinder window.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3C is a view similar to that of FIG. 3A showing the state in which the first shake level indicator has gone on;

FIG. 3D is a view similar to that of FIG. 3A showing the state in which the second shake level indicator has gone on;

FIG. 3E is a view similar to that of FIG. 3A showing the state in which the third shake level indicator has gone on;

FIGS. 5A and 5B show an example of a shielding member that covers the three shake level indicators;

FIGS. 6A and 6B show another example of a shielding member that covers the three shake level indicators;

DETAILED DESCRIPTION OF THE INVENTION

Figure 1:
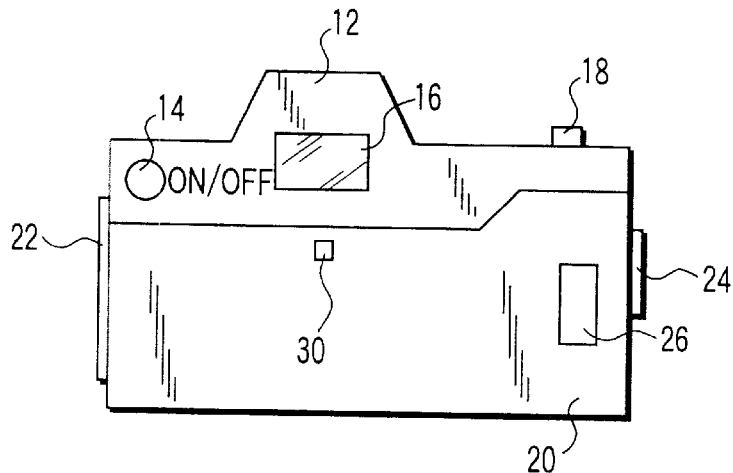
FIG. 1 is a rear plan view illustrating members placed on the body of a camera with a condition indication facility according to a first embodiment of the present invention.

FIG. 1 is a rear view of a camera with a condition indication facility according to a first embodiment of the present invention illustrating members placed on the casing of the camera.

First, the arrangement of these members placed on the casing of the camera will be described.

As shown in FIG. 1, the camera is equipped with a camera body 12, a power switch 14 provided in the camera body, a viewfinder window 16, a shutter release button 18 used for an exposure preparation/start operation, a rear cover 20 which is opened and closed for film loading and unloading, a hinge 22 for opening and closing the rear cover 20, a knob 24 operated in opening the rear cover 20, and a film window 26 used to confirm as to whether the camera has been loaded with film and what type of film has been loaded.

On the rear cover 20 of the camera there is placed a condition indication section 30 for indicating predetermined conditions of the camera. The condition indication section 30 is placed on the rear cover 20 so that it is positioned near and below the viewfinder window 16 when the rear cover 20 is closed.

The condition indication section 30 is positioned so that the photographer is allowed to confirm its indication state while looking through the viewfinder window 16. This allows the condition indication to be added without increasing the size of the viewfinder optical system.

Specifically, the condition indication section 30 will comprise well known LEDs (light emitting diodes) of a chip type. Even if they were housed inside the rear cover 20, there would be little change in the size of the camera. The condition indication is expected to indicate various conditions of the camera. Indicated contents include flash-ready indication, focus confirmation indication, and camera shake/image shake indication to be described later in detail, and so on.

The camera with a condition indication facility of the present embodiment has such components as described above.

Next, a further construction of the camera and an application of the condition indication facility of the camera to image shake warning indication will be described with reference to FIG. 2.

Figure 2:
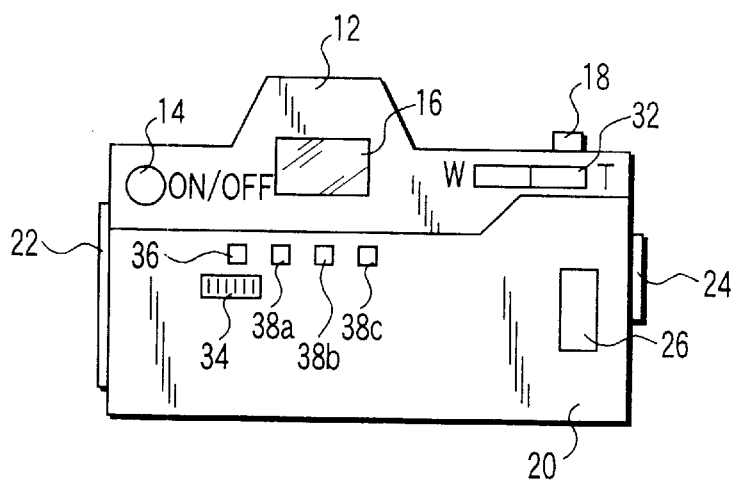
FIG. 2 is a more detail view of FIG. 1.

FIG. 2 is a rear view illustrating in more detail the construction of the camera with the condition indication facility. The description of parts in FIG. 2 corresponding to those in FIG. 1 is omitted.

As shown in FIG. 2, on the top of the rear of the camera there is placed a zoom switch 32 for changing the focal length of the taking lens not shown. On the rear cover 20 of the camera is placed a shake mode switch 34, which, when operated, causes the camera to go into the shake accommodation mode. Specifically, this mode is expected to indicate the level of a shake of an image and control the timing of starting of exposure.

Above the shake mode switch 34 is placed a shake mode indicator 36, which indicates whether or not the camera has been placed in the shake accommodation mode as a result of operation of the shake mode switch 34.

Near the shake mode indicator 36 and below the viewfinder window 16 are placed three shake level indicators 38a, 38b, and 38c. It is for the purpose of enabling the photographer to confirm easily the contents of indication while looking through the viewfinder window that the three shake level indicators are placed below the viewfinder window 16.

Next, examples of indication forms of the three shake level indicators 38a, 38b and 38c will be described with reference to FIGS. 3A to 3E.

Figure 3A:
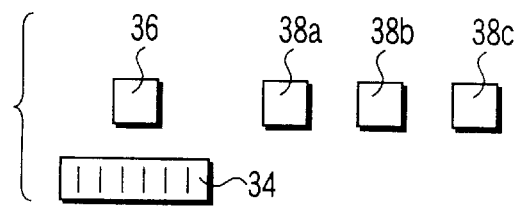
FIG. 3A illustrates three shake level indicators, a shake mode switch, and a shake mode indicator in the camera of the first embodiment and illustrates the state in which the shake mode switch is not operated.

FIG. 3A shows a state where the shake mode switch 34 is not operated and thus the camera is not placed in the shake accommodation mode. In this case, the shake mode indicator 36 and the three shake level indicators 38a, 38b and 38c are not turned on.

Figure 3B:
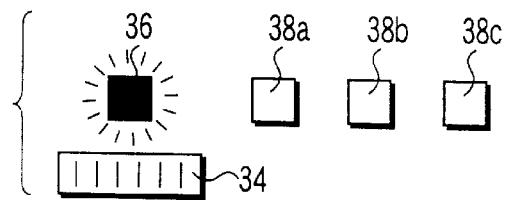
FIG. 3B is a view similar to that of FIG. 3A showing the state in which the shake mode switch has just been operated to place the camera in the shake mode.

FIG. 3B shows a state immediately after the shake mode switch 34 has been operated and the camera has been placed in the shake accommodation mode. In this case, the shake mode indicator 36 is turned on (it is shown in black), indicating that the camera has been placed in the shake accommodation mode. However, the three shake level indicators 38a, 38b and 38c remain off (they are shown in white) because the mode has just been set and the photographing-ready state is not reached.

Figure 3C:
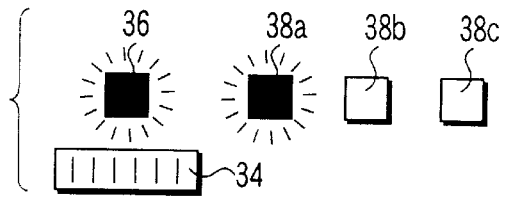
Figure 3D:
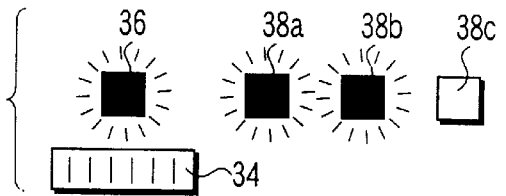
Figure 3E:
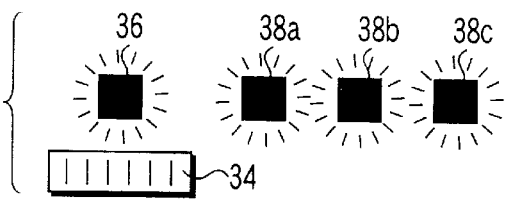

FIGS. 3C, 3D and 3E shows the shake level indicator conditions when an instruction is given to make ready for exposure after the shake mode has been set. In FIG. 3C, the first shake level indicator 38c is lit. In FIG. 3D, the first and second shake level indicators 38a and 38b are lit. In FIG. 3E, the first, second and third shake level indicators 38a, 38b and 38c are lit.

The indicators can take an indication form corresponding to the level of a camera shake that is occurring. The state shown in FIG. 3C indicates that the camera shake level is low (the case where the image moves by less than 30 $\mu$m on the image plane in 135 format). The state shown in FIG. 3D indicates that the shake level is medium (30 to 100 $\mu$m). The state shown in FIG. 3E indicates that the shake level is high (more than 100 $\mu$m).

The shake level indication is made between the moment that an instruction is given to make ready for exposure (the shutter release is depressed halfway) and the moment that an instruction is given to make exposure (the shutter release is depressed fully). Alternatively, the indication may be made during the time no instruction is given to make ready for exposure.

Next, the arrangement and the spacing of the three shake level indicators 38a, 38b and 38c will be described with reference to FIG. 4.

As described previously, the three indicators are placed on the rear cover 20 of the camera so that they are positioned near and below the viewfinder window 16 with the rear cover closed.

It is desirable that the three shake level indicators 38a, 38b and 38c be arranged in a line along the length of the viewfinder window 16. This is to make it easy for the photographer to confirm the shake level while looking the object of photography through the viewfinder. Conversely, if the indicators were arranged vertically as opposed to horizontally, it would be difficult for the photographer to confirm the shake level indication while looking through the viewfinder.

If the three indicators were arranged too proximate to one another, in the case where the three indicators are all lit as shown in FIG. 3E it would become very difficult for the photographer to confirm the shake level indication while looking through the viewfinder. In that case, the indicators would look as if they were superimposed upon one another.

Figure 4:
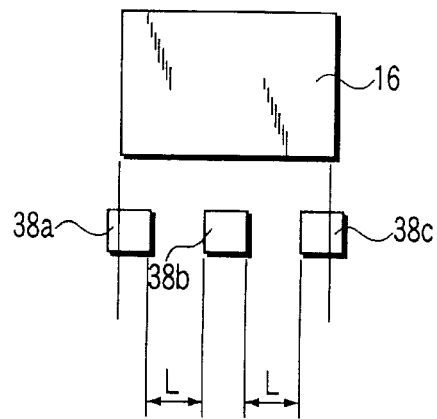
FIG. 4 is a diagram for use in explanation of the arrangement and spacing of the three shake level indicators in the camera of the first embodiment.

In the camera of this embodiment, in order to eliminate such a disadvantage, the three indicators 38a, 38b and 38c are arranged as shown in FIG. 4. That is, the indicators are arranged such that the outer edges of the indicators 38a and 38c stick out of extensions of the short sides of the viewfinder window 16 and the spacing between each of the indicators 38a and 38c and the central indicator 38b is set to at least "L".

In this embodiment, the number of the indicators is set to three; however, this is not restrictive. The spacing between each indicator can be set according to the number of actually indicated shake levels in such a way as to make it easiest for the photographer to view the indication while looking through the viewfinder.

The shake mode indicator 36 and the shake level indicators 38a, 38b and 38c are set to light in their operation; otherwise, they may be set to blink.

Hereinafter, examples of covering the state indication section in the camera will be described with reference to FIGS. 5A, 5B, 6A, and 6B.

Before describing these examples, the effectiveness of covering the condition indication will be described at this point.

The form of indication of image shake levels was described so far with reference to FIGS. 2 and 3A through 3E. The present embodiment is characterized by enabling the photographer to confirm the level of an image shake that is occurring and changes in the shake level while looking through the viewfinder window 16.

However, if, when the photographer devotes himself to the composition of a picture to be taken while looking through the viewfinder, the shake level indication varies constantly as the level of image shake varies, the photographer may be annoyed. In such a case, the problem could be dealt with by switching off the shake accommodation mode. However, this would make it impossible to implement an image shake preventive operation based on detected camera shake information, such as a shake compensation operation based on lens driving or a shake reducing operation of commencing an exposure operation at a time when the shake is small.

It is therefore desirable to, even with the shake accommodation mode set, perform no image shake level indication or cause changes in the indication not to come into the field of view of the photographer.

To this end, it would be possible to turn only the shake level indication off by, for example, depressing the shake mode switch 34 twice. However, this would require some indication to that effect.

To deal with the above problem, the camera of this embodiment makes use of the feature that the shake level indicators 38a to 38c are placed on the rear cover 20 of the camera. That is, a shielding means is provided for keeping the shake level indicators 38a to 38c from the field of view of the photographer.

A first example of a means for shielding the condition indication will be described.

FIGS. 5A and 5B illustrate a shielding member that covers the three shake level indicators 38a to 38c. As shown, a slidable member 40, serving as the shielding member, is provided at the side of the indicators in such a way that it is slidable in the directions A indicated by arrows.

In the state of FIG. 5A, the photographer can confirm the level of an image shake indicated by the three shake level indicators 38a to 38c. On the other hand, when the slide member 40 is slid over the indicators to cover them as shown in FIG. 5B, the shake level indication disappears from the field of view of the photographer. Thereby, the shake accommodation mode is allowed to be active even when it is desired to keep the indicators 38a to 38c from coming into view.

Even in the state of FIG. 5B, the shake mode indicator 36 is not covered with the slide member 40. This allows the photographer to confirm that the camera is in the shake accommodation mode.

In the example of FIG. 5A, the three indicators 38a to 38c are kept from coming into view by sliding the cover member 40 horizontally. Alternatively, the slide member 40 may be arranged below the three indicators so that they are covered by sliding that member upwards.

Next, a second example of covering the condition indication will be described.

As shown in FIGS. 6A and 6B, a panel member 42 as a shielding means is provided below the three indicators 38a to 38c.

In the state of FIG. 6A, the photographer is allowed to confirm the shake level indication based on the three indicators 38a to 38c. As shown in FIG. 6B, the three indicators are covered by folding back the member 42 upward, thus allowing the shake level indication to disappear from the field of view of the photographer. This example provides the same advantage as the first example.

In the second example, as in the first example, since the shake mode indicator 36 is not covered with the panel member 42, the photographer is allowed to confirm that the camera is in the shake accommodation mode.

In the example of FIG. 6A, the three indicators are covered by folding the panel member 42 upward; however, this is not restrictive. For example, the panel member may be provided on the right of the three indicators and folded sideways to cover the three indicators.

Figure 7:
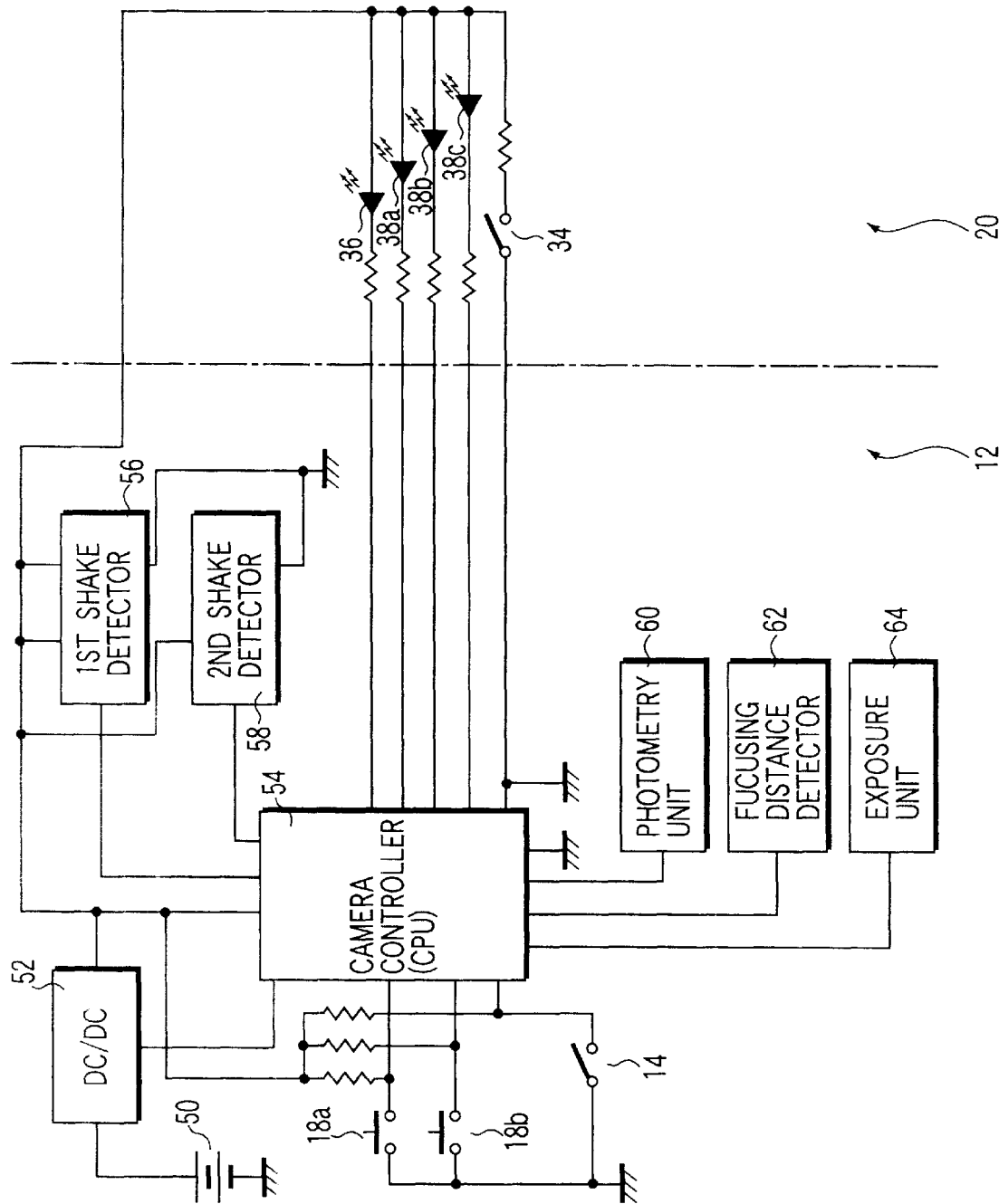
FIG. 7 shows an electrical arrangement in the camera of the first embodiment.

Hereinafter, an electrical arrangement in the camera with the condition indication facility according to the present embodiment will be described with reference to FIG. 7.

In the electrical arrangement, the camera is divided into body section 12 and back section 27.

The camera body section 12 will be described first.

The camera body section includes a battery 50 serving as a power supply for circuits in the camera, a DC/DC converter 52 for boosting and stabilizing the supply voltage of the battery and providing supply voltages to the camera circuits, and a controller (CPU) 54, powered from the DC/DC converter, for controlling the circuits in the entire camera.

To the controller 54 are connected a power switch 14, a fist release switch 18a serving as means for giving an instruction to make ready for exposure, and a second release switch 18b serving as means for giving an instruction to make exposure. Further, to the controller 54 are connected a first shake detector 56, a second shake detector 58, a photometry unit 60, a focusing distance detector 62, and an exposure unit 64.

The first and second shake detectors 56 and 58 each use a known gyro (angular velocity sensor) by way of example. The first shake detector 56 is used to detect an angular velocity resulting from a camera shake that occurs in a first direction normal to the photo-taking optical axis. The second shake detector 58 is used to detect an angular velocity resulting from a camera shake that occurs in a second direction normal to the first direction.

The photometry unit 60 makes a measurement of the light level of a picture to be taken, the focusing distance detector 62 makes a measurement of the distance to a subject, and the exposure unit 64 performs an exposure operation.

In the rear cover 20 of the camera are placed the shake mode switch 34, the shake mode indicator 36, the first shake level indicator 38a, the second shake level indicator 38b, and the third shake level indicator 38c. These components are connected to the camera controller 54. Each of the indicators 36 and 38a to 38c consists of a known LED. A plurality of resistors shown in FIG. 7 is provided to stabilize the terminal states of the CPU or regulate LED currents.

Next, the electrical workings of the camera thus arranged will be described.

Operating the shake mode switch 34 in the rear cover 20 when the power switch 14 is on sets the camera into the shake accommodation mode. In this mode, the shake mode indicator 36 is lit. When the first release switch 18a is turned on, the photometry unit 60 performs a photometering operation, determining the exposure time and the aperture setting. Then, the focal point is detected and the focusing lens is driven, though it is not illustrated how.

The outputs of the first and second shake detectors 56 and 58 are sampled into the controller 54. The focusing distance detector 62 determines the current focusing distance. On the basis of the exposure time, the output values of the shake detectors, and the current focusing distance, the level of an image shake is computed. The three shake level indicators 38a to 38c are controlled in accordance with the computed shake level.

The shake level indication operation is repeated until the second release switch 18b is turned on to perform an exposure operation or the first release switch 18a is turned off.

When the second release switch 18b is turned on, the shake level indicators go out. Then, an exposure operation is performed by the exposure unit 64. In this case, the outputs of the first shake detector 56 and second shake detector 58 are continuously monitored. When both outputs fall to a prescribed level, the exposure unit 64 starts an exposure operation. As a result, a picture scarcely blurred can be taken.

When the shake mode switch 34 is turned off by the photographer, the camera leaves the shake mode, so that the shake mode indicator 36 goes out.

Thus, according to the first embodiment of the present invention, the camera condition indication section is placed in the back of the camera and, when the back of the camera is closed, it is positioned below the viewfinder, thereby allowing camera shake conditions to be indicated to the photographer with a relatively simple construction.

A second embodiment of the present invention will be described next. The second embodiment remains unchanged from the first embodiment in the arrangement shown in FIGS. 1 through 4 but differs from the first embodiment in the electrical arrangement in the body section 12 and the rear cover 20. Thus, only the differences will be described herein.

Figure 8:
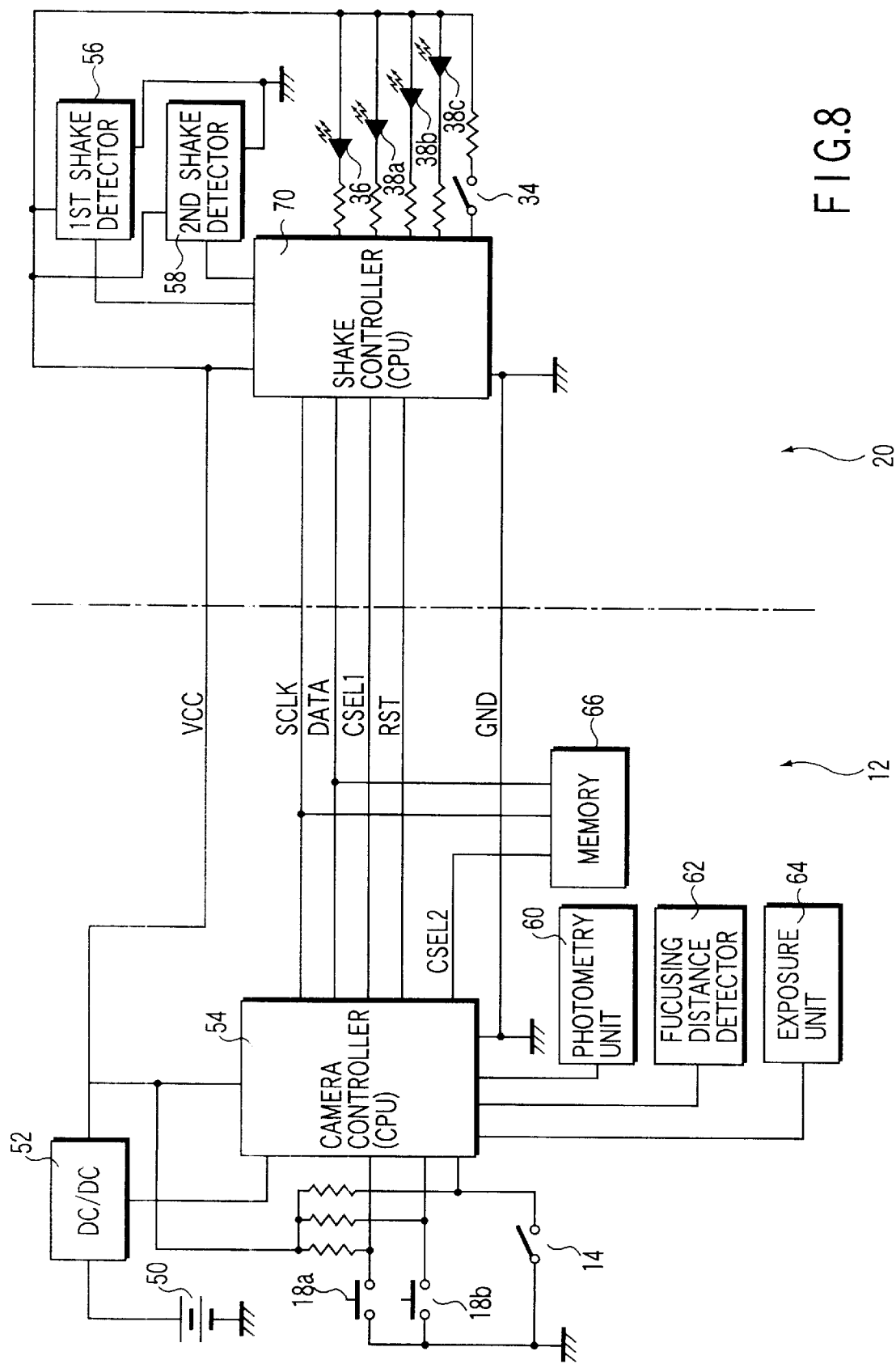
FIG. 8 shows an electrical arrangement in a camera with a condition indication facility according to a second embodiment of the present invention.

FIG. 8 shows an electrical arrangement of a camera with a condition indication facility according to the second embodiment. In this figure, like reference numerals are used to denote corresponding parts to those in FIG. 7 and description thereof is omitted.

The second embodiment is distinct from the first embodiment in that the first and second shake detectors 56 and 58 are provided in the rear cover 20 (as opposed to the camera body 12) and a shake controller 70 for controlling the sampling of the outputs of the shake detectors 56 and 58 and the shake level indicators 38a to 38c is provided in the rear cover 20.

As shown in FIG. 8, the camera body 12 is provided with the camera controller 54 to which the power switch 14, the first and second release switches 18a and 18b, the photometry unit 60, the focusing distance detector 62, the exposure unit 64, and a memory 66 consisting of, for example, an EEPROM are connected. The camera controller 54 performs all the camera operation control except the shake detection and indication control. The shake detection and indication control is performed by the shake controller 70 provided in the rear cover 20 of the camera.

Lines connecting the camera controller 54 and the shake controller 70 include six lines: power supply lines VCC and GND, a reset line RST used for the camera controller 54 to reset the shake controller 70, a serial communications line SCLK (clock) for sending information from the camera controller 54 to the shake controller 70, a data line DATA, and a chip select line CSEL1.

The serial communications line is also connected to the memory 66 in the camera body 12. The memory is connected to the camera controller 54 by a line CSEL2 so that its status is controlled, thus allowing the serial communications line SCLK to be shared between the shake controller 70 and the memory 66.

Information sent from the camera controller 54 to the shake controller 70 includes information on exposure time determined by the photometry unit 60, information on focusing distance determined by the focusing distance detector 62, and information on the operating states of the first and second release switches 18a and 18b. In response to these items of information, the shake controller 70 performs on-off control of the three shake level indicators 38a to 38c.

Information sent from the shake controller 70 to the camera controller 54 is an exposure operation starting signal when the second release switch 18b is turned on in the state where the shake accommodation mode is set by the shake mode switch 34.

The operation of the second embodiment basically remains unchanged from that of the first embodiment. Owing to the provision of two independent controllers, the second embodiment has an advantage that the shake detection and indication control can be performed by the shake controller 70 concurrently with the photometering and focusing distance operations by the camera controller 54.

A third embodiment of the present invention will be described next.

The third embodiment remains unchanged from the first and second embodiments in the arrangement shown in FIGS. 1 through 4 but differs from the first and second embodiments in the electrical arrangement. Thus, only the differences will be described herein.

Figure 9:
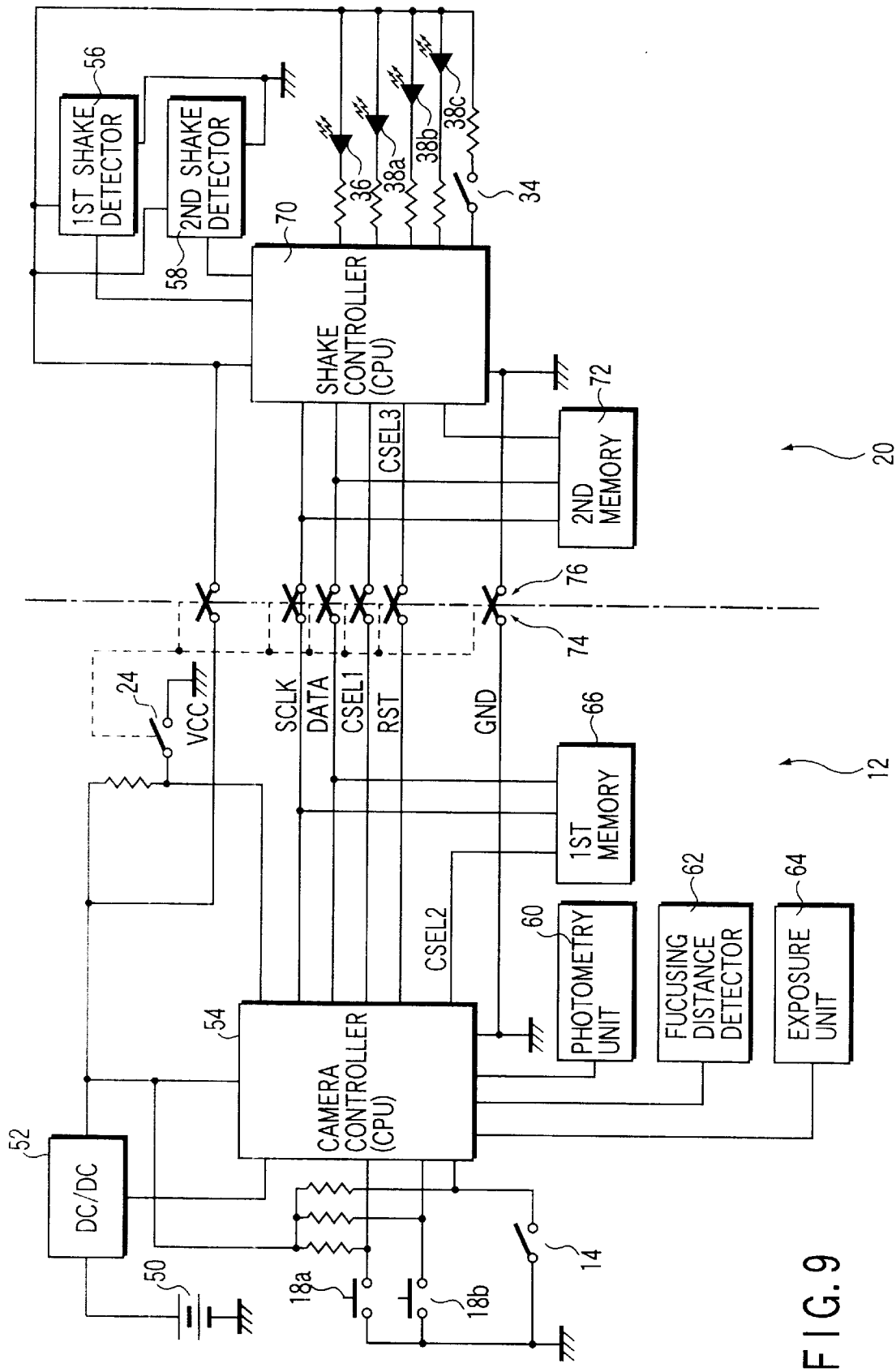
FIG. 9 shows an electrical arrangement in a camera with a condition indication facility according to a third embodiment of the present invention.
Figure 10:
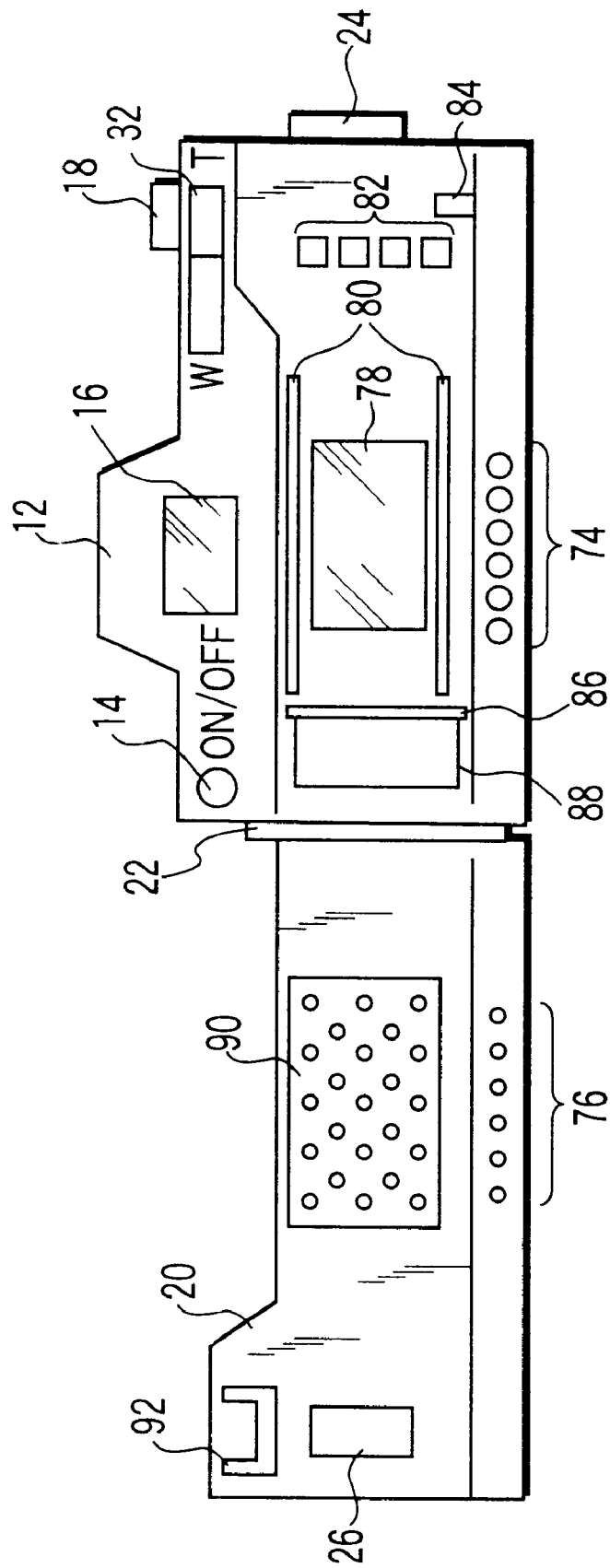
FIG. 10 is a rear view of the camera of the third embodiment showing the state where the back of the camera is open.

FIG. 9 shows an electrical arrangement of a camera with a condition indication facility according to the third embodiment and FIG. 10 is a rear view of the camera showing the state where the rear cover is opened. In this figure, like reference numerals are used to denote corresponding parts to those in FIG. 7 and description thereof is omitted.

The third embodiment is distinct from the second embodiment in that the rear cover 20, including electrical circuitry, is detachable from the camera body 12. Thus, a rear cover having circuits that permit shake detection and indication and a normal rear cover 20 having no such circuits can be selectively attached to the camera body 12.

In the third embodiment, a rear cover release knob 24 placed on the camera body side serves as a switch indicating whether the rear cover is open or closed. The camera controller 54 detects the state of the knob 24 and makes decisions about whether to send information to the shake controller 70 or not and whether to reset the shake controller 70 or not.

In the third embodiment, the memory 66 in the second embodiment is replaced with a first memory 68. This is because a second memory 72 is provided separately in the rear cover 20. The second memory 72 stores only information concerning the operation associated with the rear cover, that is, the shake detection and indication. For example, the second memory 72 stores information on the detecting sensitivity of each of the first and second shake detectors 56 and 58.

In the third embodiment, the camera body 12 and the rear cover 20 are electrically connected to each other through the use of communications contact sockets 74 on the camera body side and communications contact plugs 76 on the rear cover side as shown in FIG. 10.

In FIG. 10, the camera body 12 is provided with an opening 78 for exposure, rails 80, DX contacts 82, a film take-up spool 84, a film advance roller 86, and a film chamber 88. The rear cover 20 is provided with a film window 26, a film pressing plate 90, and a film cassette pressing member 92. Although, in FIG. 10, the shake mode switch 34, the shake mode indicator 36, and the shake level indicators 38a to 38c are not shown, they are placed on the rear side of the pressing plate 90.

The operation of the camera of the third embodiment basically remains unchanged from that of the first and second embodiments. As mentioned previously, the rear cover 20 is detachable from the camera body 12, allowing the rear cover 20 allowing the shake detection and indication and the normal rear cover 20 to be selectively attached to the camera body 12. This allows the rear cover 20 to be used as accessory equipment.

A fourth embodiment of the present invention will be described next. The fourth embodiment remains unchanged from the first embodiment in the arrangement shown in FIGS. 1 through 4 but differs from the first embodiment in the electrical arrangement in the body section 12 and the back rear cover 20. Thus, only the differences will be described herein.

Figure 11:
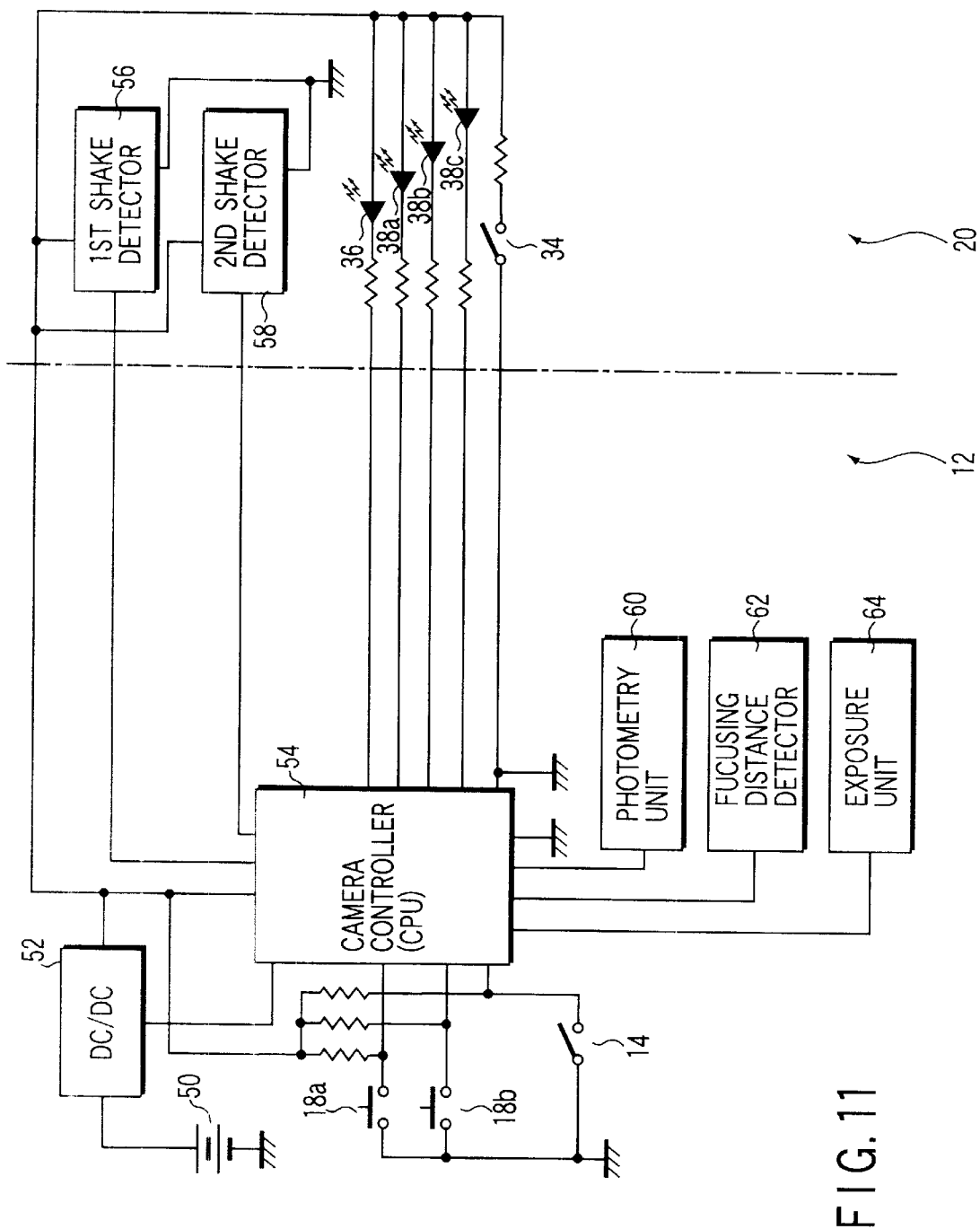
FIG. 11 shows an electrical arrangement in a camera with a condition indication facility according to a fourth embodiment of the present invention.

FIG. 11 shows an electrical arrangement of a camera with a condition indication facility according to the fourth embodiment.

The fourth embodiment is distinct from the second embodiment in that the shake controller 70 provided in the rear cover 20 in the second embodiment is eliminated. In other respects, the fourth embodiment is the same as the second embodiment.

In the fourth embodiment, the shake detection is made by the first and second shake detectors 56 and 58 provided in the rear cover 20, but the shake indication operation after the shake detection is performed by the camera controller 54. The elimination of one CPU results in reduced cost.

As described so far, the present invention can provide a camera with a condition indication facility which allows the photographer to be informed of camera shake conditions through the use of a relatively simple construction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A camera with a condition indication facility, comprising:
    a camera body;
    a viewfinder window, provided in the camera body, through which a photographer is allowed to view a subject image;
    a cover of the camera that is attached to the camera body so that it can be opened and closed; and
    a condition indication device provided in the cover of the camera for indicating operating conditions of the camera, and
    wherein the condition indication device is placed so that it is positioned near the viewfinder window when the cover of the camera is closed.

2. The camera according to claim 1, further comprising a shake detecting section for detecting a camera shake condition occurring in the camera body, and wherein the condition indication device mean is responsive to the shake detecting mean to indicate the camera shake condition.

3. The camera according to claim 1, wherein the viewfinder window is provided on the rear side of the camera.

4. The camera according to claim 1, wherein the condition indication device leaves the viewfinder window when the cover of the camera is opened.

5. The camera according to claim 1, further comprising a shake detecting section provided in the cover of the camera for detecting a camera shake condition of the camera body, and a shake control section provided in the cover of the camera for calculating the amount of camera shake on the basis of the output of the shake detecting section, and wherein the condition indicating device indicates the degree of camera shake calculated by the shake control section.

6. The camera according to claim 1, wherein the condition indication device comprises a plurality of light emitting members that are arranged along the viewfinder window when the cover of the camera is closed.

7. The camera according to claim 1, wherein the condition indication device comprises a plurality of light emitting members that are arranged below the viewfinder window when the back of the camera is closed.

8. The camera according to claim 1, wherein the condition indication device comprises a plurality of light emitting members spaced from each other by at least a predetermined distance so as to be identified.

9. The camera according to claim 8, wherein the light emitting members are arranged in a line.

10. The camera according to claim 1, further comprising a shielding member provided in the cover of the camera and which is movable between a position to cover the condition indication device and a position to expose the condition indication device.

11. The camera according to claim 1, further comprising a shielding member provided in the cover of the camera and which is slidable between a position to cover the condition indication device and a position to expose the condition indication device.

12. The camera according to claim 1, further comprising a shielding member provided in the cover of the camera and which is rotatable between a position to cover the condition indication device and a position to expose the condition indication device.

13. The camera according to claim 1, wherein a film is allowed to be loaded into the camera when the cover of the camera is open.

14. A camera with a warning facility, comprising:
a camera body;
a viewfinder window provided in the rear of the camera body through which a photographer is allowed to view a subject image;
a camera shake detecting section for detecting a camera shake condition of the camera body;
a shake control section responsive to the shake detecting section for calculating the amount of camera shake;
a warning section responsive to the shake control section for providing a warning according to the amount of camera shake calculated by the shake control section; and
a camera cover member provided with the warning section, the cover member being movable between a closed position in which the warning section is placed in the proximity of the viewfinder window and an open position in which the warning member is placed separate from the viewfinder window.

15. The camera according to claim 14, wherein the shake detecting section is placed in the camera cover member.

16. The camera according to claim 14, wherein the shake detecting section and the shake control section are placed in the camera back member.

17. The camera according to claim 14, wherein the camera back member is detachable from the camera body.

18. A camera with a condition indication facility, comprising:
a camera body;
a viewfinder window, provided in the camera body, through which a photographer is allowed to view a subject image;
a cover attached to the camera body, for opening and closing the body; and
a condition indication device provided in the cover of the camera for indicating operating conditions of the camera, and
wherein the condition indication device is placed in a position that, when the cover of the camera is closed, allows a photographer to visually recognize the condition indication section while looking through the viewfinder window.

19. The camera according to claim 18, further a comprising shake detecting section for detecting a camera shake condition of the camera body, and wherein the condition indication section is responsive to the shake detecting section to indicate the camera shake condition.

* * * * *